US005596477A

United States Patent [19]

Horton

[11] Patent Number: 5,596,477

[45] Date of Patent: Jan. 21, 1997

[54] CONTACTLESS SIGNALING DEVICE

[75] Inventor: Norman B. Horton, Tecumseh, Mich.

[73] Assignee: Faraday, Inc., Tecumseh, Mich.

[21] Appl. No.: 57,271

[22] Filed: May 3, 1993

[51] Int. Cl.[6] .......................... G10K 1/063; H04M 11/04; G08B 3/00

[52] U.S. Cl. .......................... 361/160; 361/173; 361/174; 361/176; 340/328; 340/388.1; 340/388.5

[58] Field of Search .......................... 307/10.1; 361/160, 361/170, 173, 174, 176, 177; 250/573; 340/630, 328, 815.79, 815.8, 388.1, 388.5, 388.6

[56] References Cited

U.S. PATENT DOCUMENTS

| | | | |
|---|---|---|---|
| 666,737 | 1/1901 | Coleman | 361/173 |
| 1,523,149 | 1/1925 | Wheeler | 361/174 |
| 3,027,554 | 3/1962 | Cassell | 340/392 |
| 3,184,622 | 5/1965 | Levine | 310/30 |
| 3,287,608 | 11/1966 | Pokrant | 317/142 |
| 3,389,386 | 6/1968 | Rowell | 361/173 |
| 3,515,966 | 6/1970 | DeValroger et al. | 318/127 |
| 3,594,770 | 7/1971 | Ham | 340/273 |
| 3,633,036 | 1/1972 | Nuckolls | 250/214 R |
| 3,805,190 | 4/1974 | Berlin et al. | 331/116 |
| 3,840,789 | 10/1974 | Dion | 318/128 |
| 3,846,792 | 11/1974 | Haigh | 340/384 |
| 3,921,087 | 11/1975 | Vosteen | 332/2 |
| 3,956,628 | 5/1976 | Hanger | 250/205 |
| 4,015,912 | 4/1977 | Kofink | 361/174 |
| 4,064,482 | 12/1977 | Maisch et al. | 340/58 |
| 4,122,378 | 10/1978 | Brown | 318/128 |
| 4,170,770 | 10/1979 | Ichinose et al. | 340/634 |
| 4,189,724 | 2/1980 | Onuma et al. | 340/607 |
| 4,335,418 | 6/1982 | Clement | 361/152 |
| 4,413,179 | 11/1983 | Matsuoka et al. | 250/232 |
| 4,567,451 | 1/1986 | Greenwood | 331/155 |
| 4,599,052 | 7/1986 | Langen | 361/175 |
| 4,675,661 | 6/1987 | Ishii | 340/630 |

FOREIGN PATENT DOCUMENTS

| | | |
|---|---|---|
| 1185652 | 6/1963 | Germany . |
| 562053 | 8/1977 | U.S.S.R. . |

OTHER PUBLICATIONS

Brochure reference, *Fire Alarm Signaling Devices—6100/5500 Series*, Faraday, Inc., 1990.

Brochure reference, *Fire Alarm Signaling Devices—44/4700 Series*, Faraday, Inc., 1990.

*Primary Examiner*—William M. Shoop, Jr.
*Assistant Examiner*—Peter Ganjoo
*Attorney, Agent, or Firm*—Emch, Schaffer, Schaub & Porcello

[57] ABSTRACT

A contactless signaling device for operating a horn or bell is disclosed. The signaling device has an electro-magnetic coil which drives an armature. A light source is positioned opposite a light sensor and a shutter portion of the armature moves between the source and the sensor periodically blocking the light flow. The light sensor is in electrical communication with the electro-magnetic coil. A spring connected to the armature moves the shutter portion when current is not supplied to the coil thereby supplying the desired pulsing as the armature striker engages a horn diaphragm or bell gong.

14 Claims, 3 Drawing Sheets

CONTACTLESS SIGNALING DEVICE

BACKGROUND OF THE INVENTION

The present invention relates to a contactless signaling device. Many prior art devices have been produced in the past. A typical prior art structure is composed an electromagnetic coil, a moving member or armature that is caused to move by the coil and a bell gong or a horn diaphragm. The action of the moving member in striking the gong or diaphragm causes sound to be emitted. When these electromechanical devices are operated from direct current, contact means are provided for the intermittent or interrupted application of the DC power to the coil of the solenoid. In the prior art, it has been customary to use a set of mechanically operated electrical contacts that are closed when the signal is at rest and which open in response to the activation of the reciprocating mechanism or armature.

The prior art mechanically operated electrical contacts have a variety of well known disadvantages. The contacts must be capable of interrupting the peak current to the solenoid. Also, the adjustment of the mechanically operated electrical contacts relative to when they make and break or close and open relative to the motion of the reciprocating member is often critical.

One of the primary disadvantages of the prior art mechanically operated electrical contacts is that after a period of time they sometimes become inoperative or may stick or weld together. Sometimes a particle of insulating matter or other type of ambient particles may become interposed between the contacts, causing the current to stop flowing in the signaling device. When this occurs the signaling device stops operating.

A prior art device is shown in U.S. Pat. No. 4,335,418. This patent discloses an electronic driving circuit in which the discharge and subsequent recharging of a capacitor provides the timing for the interruption of current through the solenoid coil. A set of mechanical contacts is employed to discharge and, alternatively, allow the recharging of the capacitor.

SUMMARY OF THE INVENTION

The present invention is directed to an improved signaling device that includes an electronic circuit that opens and closes the circuit to a electro-magnetic coil. This causes a reciprocating member to move without resorting to mechanical, switching contacts and the problems related to such contacts. A solid state circuit is provided that controls the current flow through the electro-magnetic coil of the signaling device. The circuit is controlled by a light-emitting device and a light-sensing device. A shutter is operatively connected to the armature of the electro-magnetic coil. The shutter portion moves so that it alternatively allows the light beam from the light-emitting device to travel to the light sensor and then interrupts this beam. This action through the electronic circuit causes current alternatively to flow and then to cease flowing through the electro-magnetic coil. As it is the magnetic force from the coil that causes the reciprocating member and the shutter portion to move, the shutter portion will reciprocate until the source of D.C. potential is removed. During the travel of the reciprocating member a sounding member is struck. The sounding member is a diaphragm in the case of horn or the gong in the case of a bell. The repeated striking occurs until the source of the D.C. potential is removed. Throughout the reciprocating action, sound is emitted from the sounding member.

It is primary object of the present invention to provide an improved signaling device including providing circuit means for intermittently energizing an electro-magnetic coil without employing mechanical contacts which make and break the actuating circuit.

It is a further object of the present invention to provide a signaling device whereby the energized time of the coil is controlled without the use of a capacitor so that the energized time is in harmony with the motion of the reciprocating member or armature.

It is a still further object of the present invention to intermittently energize an electro-magnetic coil in response to the application of D.C. potential and to interrupt the D.C. potential to the coil by means of an electrical circuit that, in turn, is controlled by the combination of a light source, a light sensing member and a reciprocating shutter which is interposed between the light source and the light sensor member.

Further objects of the invention will become apparent from the following description of the invention.

DESCRIPTION OF THE PREFERRED EMBODIMENTS

Figure 1:
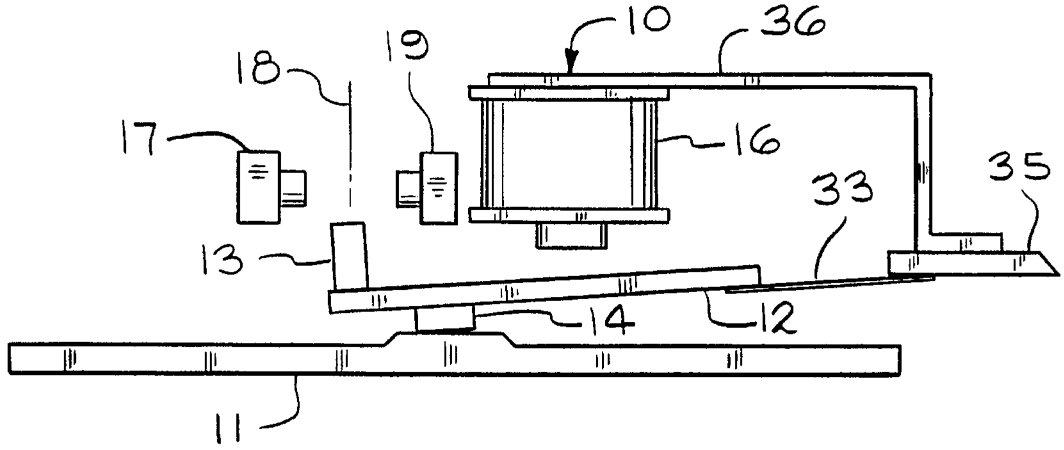
FIG. 1 is a diagrammatic view of a signaling device, according to the present invention.
Figure 2:
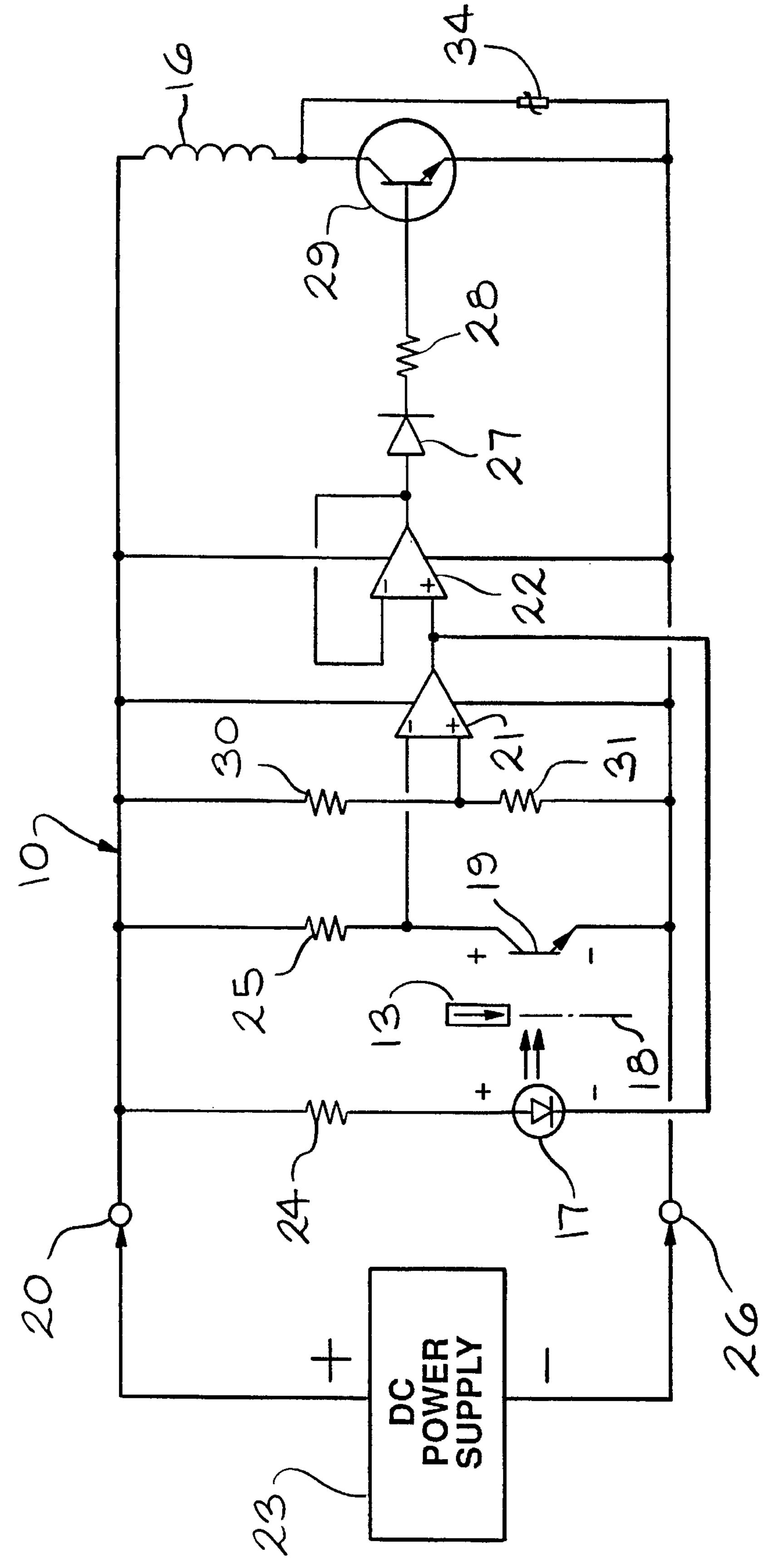
FIG. 2 is a circuit schematic of the FIG. 1 embodiment and showing the location of the shutter portion of the armature.

A signaling device, according to the present invention, is generally indicated in FIGS. 1 and 2 by the reference number 10. In the present embodiment the signaling device 10 includes a horn having a horn diaphragm 11. An armature 12 includes a shutter portion 13 and a striker portion 14. The armature 12 is reciprocally driven each time a magnetic coil 16 is energized and then de-energized. The striker portion 14 of the reciprocating armature 12 strikes the diaphragm to operate the horn. In the FIG. 1–FIG. 2 embodiment, a light source member 17 is positioned on an opposed side of a predetermined path 18 from a light sensing member 19. In the present embodiment, the light source member 17 is a light-emitting diode (LED) and the light sensing member 19 is a photo-transistor. Referring to FIG. 2, a pair of operational amplifiers 21 and 22 are included in the circuit. They are preferably of the voltage-sensing variety. If the voltage at the non-inverting positive terminal is higher than that at the inverting negative terminal, the output terminal will have a positive potential that is near that of the positive terminal of a D.C. potential source or D.C. power supply 23. If the opposite conditions are true, the output terminal of the operational amplifier will have a negative potential that is near that of the negative terminal of the D.C. power supply 23.

When the D.C. power supply 23 is connected to its terminals 20 and 26, current will flow through a resistor 24 and the light source member 17. The light source member or LED 17 emits light which, upon reaching the light sensing member or photo-transistor 19, will cause it to conduct. The voltage at the junction of a resistor 25 and the voltage at the light sensing member 19 will drop until the voltage supplied to the negative "–" input of the operational amplifier 21 becomes less than that supplied to the "+" terminal so the output terminal will become positive. This positive voltage is supplied to the "+" terminal of the operational amplifier 22 causing its output terminal to become positive. This positive voltage causes current to flow through a diode 27, through a resistor 28 to the base of a transistor 29 and then out the emitter of the transistor 29 to the negative side of the D.C. power supply 23. Because the transistor 29 is now biased to be conductive, a current path is established from the positive terminal 20 of the power supply 23, through the electromagnetic coil 16. As is well known, as the current passes through the coil 16, a magnetic field develops that attracts the armature 12 causing it to begin moving away from the horn diaphragm 11 (see FIG. 1). The shutter portion 13 of the armature 12 begins to move along its predetermined path 18. During the travel of the shutter portion 13, it moves between the light source member 17 and the light sensing member 19. This action reduces the amount of light reaching the light sensing member or photo-transistor 19 and it stops conducting current. This action allows the resistor 25 to supply full voltage to the "–" terminal of the operational amplifier 21. The voltage supplied to the "+" terminal is derived from the voltage divider consisting of a pair of resistors 30 and 31. The voltage at the "–" terminal is now higher than that at the "+" terminal so that the output terminal will become negative. The output terminal of the operational amplifier 22 now goes negative. The current flowing through the diode 27, the resistor 28 and through the base of the transistor 29, then ceases. As the transistor 29 is no longer biased on, it stops conducting current. As the current ceases to flow through the coil 16, its magnetic field will collapse and the armature 12 will no longer be attracted toward the coil 16. This allows a spring 33 to move the armature 12 away from its coil 16 and back toward the diaphragm 11 where the striker portion 14 strikes the diaphragm 11 causing a pulse sound to be emitted. At this time, the movement of the armature 12 causes its shutter portion 13 to move out of the light path between the light source member 17 and the light sensing member 19. The light sensing member 19 will again sense light and become conductive. The actions described above are repeated until the source of D.C. potential or D.C. power supply 23 is disconnected.

Referring to FIG. 2, in the present embodiment a metal-oxide varistor 34 is provided to protect the transistor 29 from damage that may be caused by the reverse EMF that is released by the coil 16 whenever its current source is interrupted. In other embodiments, the varistor or its equivalent will not be necessary if the voltage rating of the transistor is high enough to withstand the reverse EMF.

Referring to FIG. 1, the signaling device 10 includes a base 35 which mounts a bracket 36. The bracket 36 mounts the coil 16 and the spring 33 is interconnected between the armature 12 and the base 35. An important feature of the present invention is that the signaling device 10 eliminates the needs for mechanical contacts which make and break the activating current. These mechanical contacts have created problems in prior art signaling devices.

Figure 3:
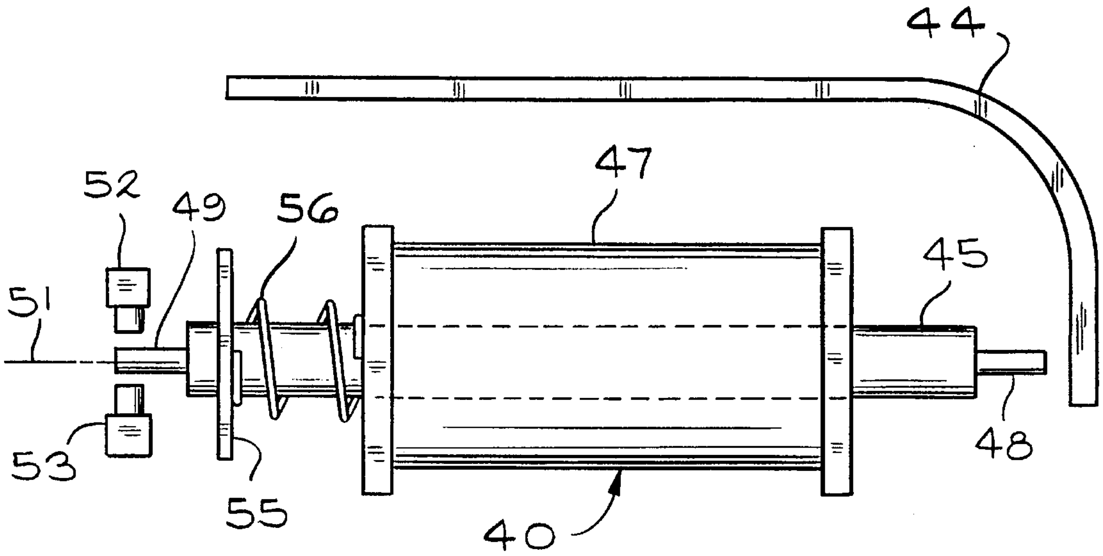
FIG. 3 is a view similar to FIG. 1, showing another embodiment of a signaling device, according to the present invention.
Figure 4:
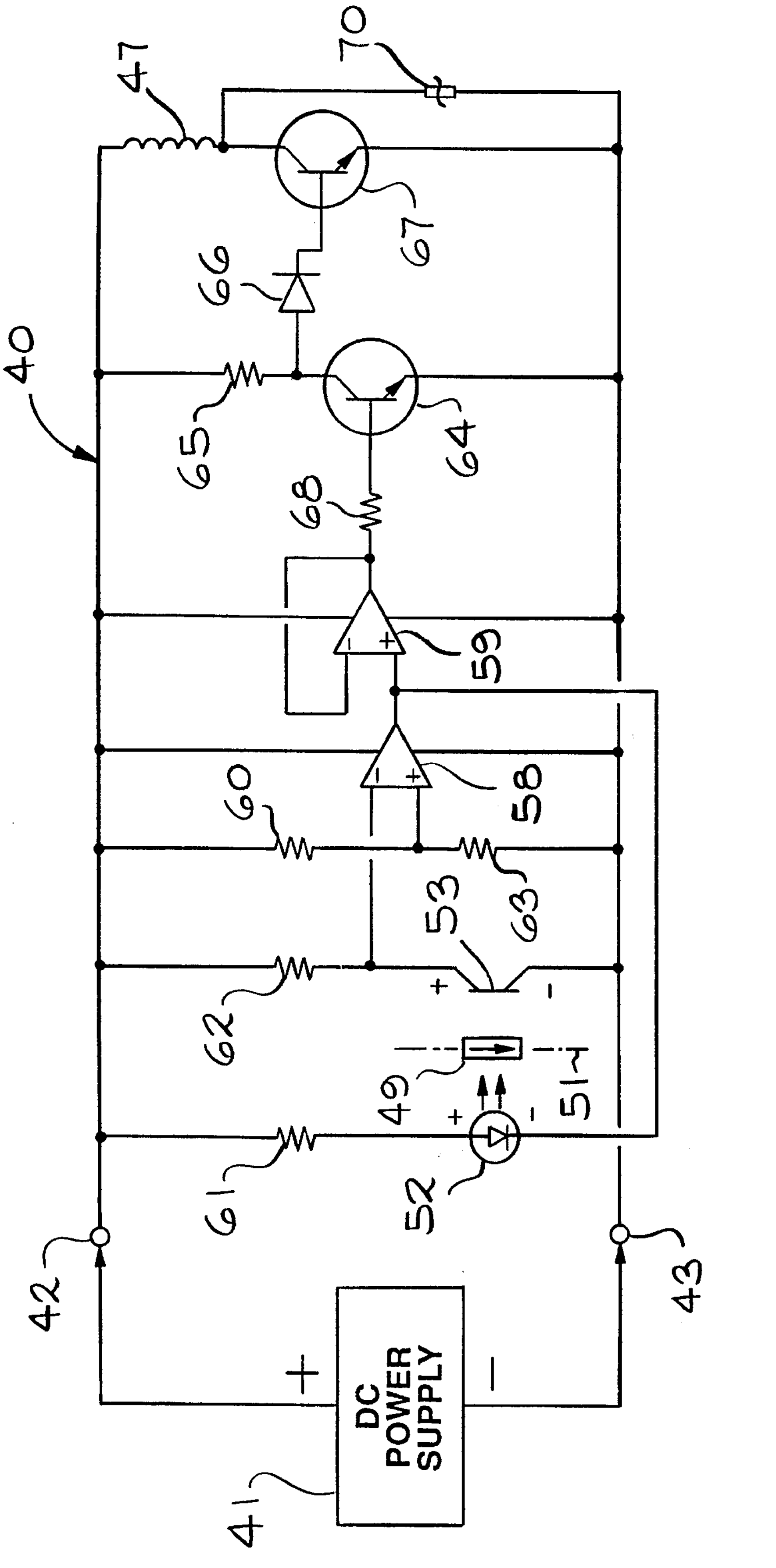
FIG. 4 is a circuit schematic similar to FIG. 2 for the FIG. 3 embodiment.

Referring to FIGS. 3 and 4, another embodiment of a signaling device, according to the present invention, is generally indicated by the reference number 40. A D.C. potential source or D.C. power supply 41 is connected to terminals 42 and 43. The signaling device 40 includes a gong 44 mounted adjacent an armature 45. The armature 45 is received and is reciprocately mounted within an electromechanical coil 47. The armature 45 includes a striker portion 48 positioned adjacent the gong 44 and a shutter portion 49 positioned at the opposed end. The shutter portion 49 reciprocates along a predetermined path 51. A light source member, such as a light-emitting diode (LED) 52 is positioned on one side of the path 51 and a light sensing member, such as a photo-transistor 53 is positioned on the opposite side of the path 51. Light from the light source member 52 is received by the light sensing member 53. As the shutter portion 49 of the armature 45 reciprocates along the path 51, it interrupts the light passing between the members 52 and 53.

Referring to FIG. 3, a ring member 55 is mounted on the armature 45 and a spring 56 extends between the ring member 55 and the coil 47 urging the shutter portion 49 of the armature 45 into a position between the light source member 52 and the light sensing member 53.

In the signaling device 40, operational amplifiers 58 and 59 are preferably provided in the electrical circuit. The operational amplifiers 58 and 59 are of the voltage-sensing variety. If the voltage at the non-inverting (+) terminal is higher than it is at the inverting (–) terminal, the output terminal will have a positive potential that is near that of the positive terminal of the D.C. power source 41. If the opposite conditions are true, the output terminal of the operational amplifier will have a negative potential that is near that of the negative terminal of the D.C. power supply 41.

When the D.C. power supply 23 is connected to the terminals 42 and 43, current will flow through a resistor 61 and the light source member 52. The light source member 52 will emit light which will be kept from reaching the light sensing member 53 because the shutter portion 49 is positioned between the light source member 52 and the light sensing member 53. This prevents the light sensing member or photo-transistor 53 from conducting. The voltage at the junction of a resistor 62 and the light sensing member 53 will be high so the voltage supplied to the "–" input of the operational amplifier 58 will be higher than that supplied to the "+" terminal so the output terminal will become negative. The "+" terminal derives its voltage from the voltage divider comprised of resistors 60 and 63. This negative-going voltage is supplied to the "+" terminal of the operational amplifier 59, causing its output terminal to become negative. Because of this, a transistor 64 is biased off and does not conduct. This non-conductance allows current to flow through a resistor 65 and a diode 66 to the base of a transistor 67. This forward bias causes the transistor 67 to conduct. As current now passes through the coil 47, it develops a magnetic field. This field attracts the armature 45 causing its striker portion 48 to move toward the gong 44 of the bell. As the striker portion 48 strikes the gong 44, a pulse sound is emitted. The shutter portion 49, being attached to move with the armature 45, moves against the force of the spring 56 along its path 51 and moves to a point where it no longer interferes with the light transmittal between the light source member 52 and the light sensing member 53.

Light now strikes the light sensing member or photo-transistor 53 so that it becomes conductive. This conductance pulls the voltage down at the junction of the resistor 62 and the light sensing member 53. Therefore, the voltage at the "–" terminal of the operational amplifier 58 is reduced so that the voltage of the "+" terminal is now higher. Therefore, the output of the operational amplifier 58 becomes positive. This positive voltage is presented to the "+" terminal of the operational amplifier 59 so that its output becomes positive.

This positive voltage reaches the base of the transistor 64 through a resistor 68 so that the transistor 64 is biased on. This conductance pulls the voltage at the junction of transistor 64 and resistor 65 down so that the forward bias is no longer supplied to the transistor 67. Therefore, current flow through the coil 47 ceases and the magnetic field collapses. The spring 56 urges the armature back toward its resting position and the shutter portion 49 moves along the predetermined path 51 so that it again interferes with the light transmittal between the light source member 52 and the light sensing member 53.

This causes the light sensing member or photo-transistor 53 to stop conducting. The above-described sequence of events begins again and repeats until the D.C. power supply 41 is removed.

Preferably a metal-oxide varistor 70, or other suitable devices, are provided to protect the transistor 67 from damage that may be caused by the reverse EMF that is released by the coil 47 whenever the current flow through the coil 47 is interrupted.

Many other revisions may be made to the above embodiments of a signaling device, according to the present invention, without departing from the scope of the invention or from the following claims.

I claim:

1. A signaling device comprising, in combination, a coil, an armature driven by said coil, a means for signaling adjacent said armature, said armature engaging said means for signaling, said armature including a shutter portion reciprocately movable along a predetermined path, a light source member and a light sensing member positioned on opposed sides of said predetermined path, a D.C. power source in communication with said light source, said light sensing member and said coil, whereby when the current to said coil is interrupted or resumed by the reciprocal movement of said shutter portion between said light source and said light sensing member said means for signaling is actuated.

2. A signaling device, according to claim 1, wherein said means for signaling is a horn, said horn having a diaphragm, said armature including a striker portion positioned adjacent said diaphragm, whereby said striker portion periodically engages said diaphragm providing audible horn pulses.

3. A signaling device, according to claim 1, wherein said means for signaling is a bell, said bell having a gong, said armature including a striker portion positioned adjacent said gong, whereby said striker portion periodically engages said gong providing audible bell pulses.

4. A signaling device, according to claim 1, wherein said light source member comprises a light emitting diode and said light sensing member comprises a photo-transistor.

5. A signaling device, according to claim 4, including circuit means operatively connected between said photo-transistor and said coil for alternatively causing current to flow and then cease to flow through said coil.

6. A signaling device, according to claim 5, wherein said circuit means includes a pair of operational amplifiers and at least one transistor in communication with said coil.

7. A signaling device, according to claim 6, including a varistor operatively connected to said transistor.

8. A signaling device comprising, in combination, an electro-magnetic coil, an armature adjacent said coil and moved by said coil, a means for signaling, said armature including a striker portion for engaging said means for signaling, said armature including a shutter portion movable along a predetermined path, a light source member and a light sensing member positioned on opposed sides of said predetermined path, circuit means operatively connected between said light source member, said light sensing member and said coil for alternately causing current to flow and then cease to flow through said coil and whereby said shutter portion is reciprocately moved along said predetermined path between said light source member and said light sensing member.

9. A signaling device, according to claim 8, including spring means operatively connected to said armature for moving said shutter along said predetermined path when current ceases to flow through said coil.

10. A signaling device, according to claim 9, wherein said means for signaling is a horn.

11. A signaling device, according to claim 9, wherein said means for signaling is a bell.

12. A signaling device, according to claim 9, wherein said light source member comprises a light-emitting diode and said light sensing member comprises a photo-transistor.

13. A signaling device, according to claim 12, including a D.C. power supply and circuit means operatively connected between said power supply, said light-emitting diode, said photo-transistor, and said coil for alternately causing current to flow and then cease to flow through said coil.

14. A signaling device, according to claim 13, including at least one transistor operatively connected to said coil.

* * * * *